United States Patent
Bird et al.

(10) Patent No.: US 6,210,618 B1
(45) Date of Patent: *Apr. 3, 2001

(54) METHOD OF MANUFACTURING A PERIPHERALLY ENCAPSULATING UNIT

(75) Inventors: Kevin Bird, Holland; Lloyd Kaper, Hamilton; Bob Herrmann, Grand Haven; Craig Bienick, Jenison; Gary Reames, Muskegon; Howard Daley; Greg Wolters, both of Zeeland, all of MI (US)

(73) Assignee: Gemtron Corporation, Sweetwater, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,775

(22) Filed: Dec. 1, 1997

(51) Int. Cl.⁷ .............................. B29C 45/14; B29C 61/02
(52) U.S. Cl. ..................... 264/237; 264/252; 264/271.1; 264/DIG. 71
(58) Field of Search ................... 264/237, 252, 264/261, 263, 271.1, 273, 274, 230, 248, 249, 250, DIG. 71

(56) References Cited

U.S. PATENT DOCUMENTS

| | | |
|---|---|---|
| 1,981,334 | 11/1934 | Schmalz . |
| 3,207,830 * | 9/1965 | Aldington ............................ 264/249 |
| 3,232,615 * | 2/1966 | Faulkner, III ....................... 264/249 |
| 3,363,390 | 1/1968 | Crane et al. . |
| 3,399,018 * | 8/1968 | Leblanc ............................... 264/249 |
| 3,470,604 * | 10/1969 | Zenick ................................ 264/249 |
| 4,626,185 | 12/1986 | Monnet . |
| 4,695,420 | 9/1987 | Grawey et al. . |
| 4,830,804 * | 5/1989 | Weaver .............................. 264/263 |
| 4,870,736 | 10/1989 | Kacalieff . |
| 4,914,888 | 4/1990 | Hanson . |
| 5,156,792 * | 10/1992 | Holdaway et al. ................... 264/249 |
| 5,193,262 | 3/1993 | Hyde et al. . |
| 5,273,354 | 12/1993 | Herrmann et al. . |
| 5,329,686 * | 7/1994 | Kildal et al. ........................... 29/450 |
| 5,362,145 | 11/1994 | Bird et al. . |
| 5,363,628 * | 11/1994 | Basar et al. ........................ 52/745.19 |
| 5,403,084 | 4/1995 | Kane et al. . |
| 5,429,433 | 7/1995 | Bird et al. . |
| 5,441,338 | 8/1995 | Kane et al. . |
| 5,454,638 | 10/1995 | Bird et al. . |
| 5,476,423 | 12/1995 | Meyer . |
| 5,647,930 * | 7/1997 | Bright ................................. 156/73.5 |
| 5,670,108 * | 9/1997 | Kern et al. .......................... 264/248 |
| 5,676,894 * | 10/1997 | Specht ................................ 264/252 |
| 5,766,539 * | 6/1998 | Fujita et al. ....................... 264/271.1 |
| 5,772,822 | 6/1998 | Dupuy . |

FOREIGN PATENT DOCUMENTS

| | | |
|---|---|---|
| 0520577 | 6/1992 | (EP) . |
| 0613766 | 2/1994 | (EP) . |
| 875506 | 9/1941 | (FR) . |
| 1570816 | 3/1977 | (GB) . |
| 94/24908 | 4/1994 | (WO) . |

\* cited by examiner

*Primary Examiner*—Angela Ortiz
(74) *Attorney, Agent, or Firm*—Diller, Ramik & Wight, PC

(57) ABSTRACT

A peripherally encapsulated unit is manufactured by molding a peripheral encapsulation of a predetermined internal peripheral contour and internal peripheral size from hot polymeric material in a mold. The mold is opened and a member is positioned in internal relationship to the hot molded peripheral encapsulation. Thereafter, the hot molded peripheral encapsulation shrinks as it cools to reduce its internal peripheral size thereby unitizing the peripheral encapsulation with a peripheral edge portion of the member to form a peripherally encapsulated unit, such as a cook top, range door, "touch" control panel, or the like.

31 Claims, 2 Drawing Sheets

METHOD OF MANUFACTURING A PERIPHERALLY ENCAPSULATING UNIT

BACKGROUND OF THE INVENTION

Heretofore it has been conventional to provide a support frame for receiving and retaining a panel of glass as part of a wall or door assembly. Such a support frame includes an integrally formed body of uniform cross section defining a generally inwardly opening channel as disclosed in, for example, U.S. Pat. No. 4,914,888 in the name of Laurence B. Hanson which granted on Apr. 10, 1990. Screws are inserted through an opening in one side wall of the channel and are threaded into an opening in a second side wall of the channel to draw the two side walls into gripping contact with the glass panel, thus providing a relatively unitized and rigid supporting frame.

Typical also of a frame of this type is such as that disclosed in U.S. Pat. No. 3,363,390 in the name of Jameson Crane granted on Jan. 16, 1968. The frame member in this case is extruded and is folded around a peripheral edge of an associated panel with a screw uniting a single corner of the frame.

More recently it has become conventional to insert a panel in a mold, isolate a peripheral edge portion of the panel and injection mold a polymeric/copolymeric frame about the edge of the panel. Such frames are utilized as front and rear windshields for automobiles or other glass panels for vehicles or buildings, as is reflected in U.S. Pat. No. 4,695,420 granted on Sep. 22, 1986 to Charles E. Grawey et al. and U.S. Pat. No. 4,626,185 granted on Dec. 2, 1986 to Bernard Monnet.

Such injection molded encapsulation is now conventional in shelving, particular for refrigerators, as is evidenced by U.S. Pat. Nos. 5,273,354; 5,362,145; 5,403,084; 5,429,433; 5,441,338 and 5,454,638 issued respectively on Dec. 28, 1993; Nov. 8, 1994; Apr. 4, 1995; Jul. 4, 1995; Aug. 15, 1995 and Oct. 3, 1995, all assigned to the assignee of the present application.

Typically, such shelves are manufactured in an injection mold of the type disclosed in pending application Ser. No. 08/303,200 filed on Sep. 8, 1994 in the names of Max Meier et al. In the latter disclosure a glass plate or panel has its peripheral edge located in a peripheral cavity into which highly pressurized plastic material is injected and, upon subsequent cooling, the edge of the panel is bounded by a polymeric frame or encapsulation which, since intended for use as a refrigerator shelf, has also integrally unitized thereto opposite metallic shelf brackets. A cook top is manufactured similarly in pending application Ser. No. 08/890,651 filed on Jul. 9, 1997.

SUMMARY OF THE INVENTION

In keeping with the forgoing, a primary object of the present invention is to provide a novel and unobvious method of manufacturing a peripherally encapsulated unit, such as a refrigerator shelf, a range oven door, a microwave oven door, a cook top, a hob top, a "touch" control panel or the like. Preferably, an injection mold is provided which defines a peripheral cavity in which can be injection molded a frame or encapsulation having an inwardly opening preferably continuous channel. At the completion of the injection molding of the frame, the cavity is at least partially opened, and a panel, such as a Ceran® or glass panel, is moved into the mold into alignment with a channel of the still hot injected frame or encapsulation. A peripheral edge of the panel is maintained in alignment with the channel of the encapsulation as the latter cools. The cooling of the encapsulation or injection molded frame results in the shrinkage thereof which brings the channel into progressive intimate embracing relationship to a peripheral edge of the glass or Ceran® panel eventually resulting in a unitized peripherally encapsulated unit which can, for example constitute a cook top, a door for a range oven, a "touch" control panel for an oven, range or the like wherein the Ceran®/glass panel includes so-called "touch" circuitry, or similar structures. One major advantage of the aforesaid method is that during the molding thereof, the panel need not be inserted into the mold and subject to heat and pressure which is highly undesirable, particularly in such applications as "touch" control panel circuitry, the electronics of which can be adversely effected under relatively high molding temperatures. Thus, no matter the material from which the "insert" member might be made, it is subject to less pressure and temperature than heretofore noted and only the peripheral edge thereof is briefly subject to elevated temperature as the encapsulation/frame cools and shrinks into conformity with the periphery of the insert. Thus, relatively close tolerances can be maintained at high production output and at minimum deterioration, as might not otherwise occur under elevated injection molding temperatures and pressures.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
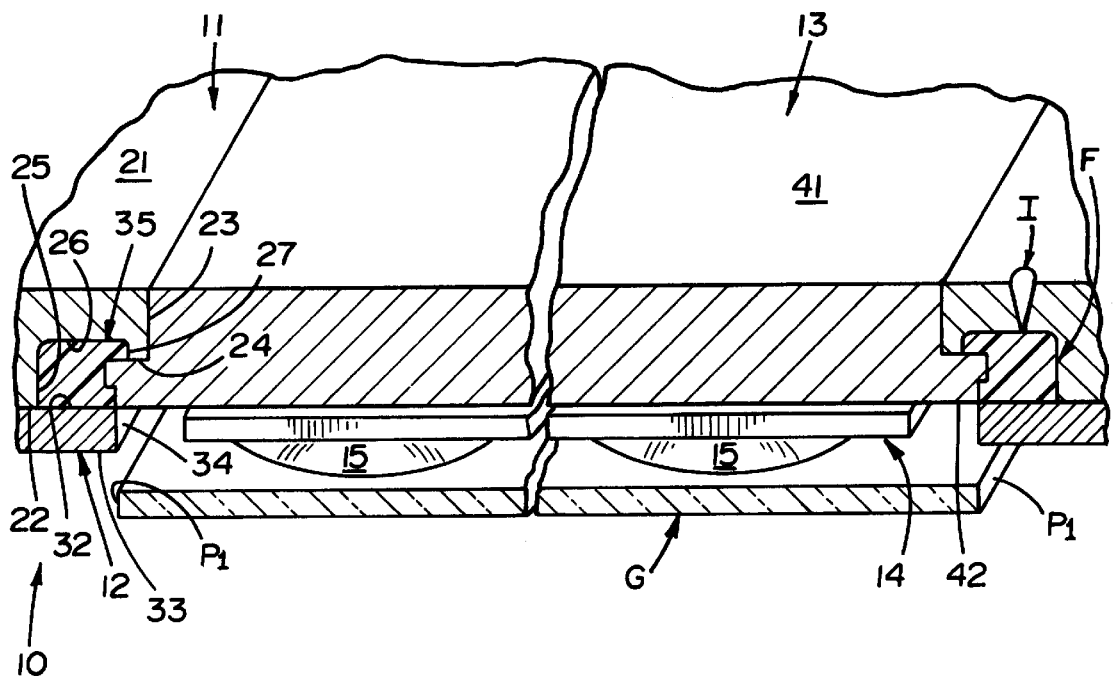
FIG. 1 is a fragmentary diagrammatic perspective view of a mold of the present invention, and illustrates upper and lower mold bodies and a central mold core defining a peripheral cavity in which has been injection molded a polymeric/copolymeric encapsulation or frame and externally of which a relatively flat panel of Ceran® panel, glass or the like is supported by vacuum cups of a movable vacuum cup mounting plate.

A mold 10 is illustrated in the fully closed position thereof in FIG. 1 of the drawings, and includes an upper mold body or cavity steel 11, a lower mold body or cavity steel 12, and an inner central mold or core steel 13 beneath which and spaced therefrom is a vacuum cup mounting member or plate 14 which carries a plurality of vacuum cups 15 connected conventionally through valved lines (not shown) to a source of negative air pressure (also not shown).

The upper mold body 11 is of a generally open polygonal frame-like configuration defined by an upper surface 21, a lower surface 22, an inner peripheral surface 23, a medial annular surface 24 and three cavity-defining surfaces 25, 26 and 27 with the surfaces 25, 26 and 26, 27 merging at rounded radius surfaces (unnumbered). The cavity-defining surfaces 25, 27 are substantially in parallel relationship to each other, and each is substantially normal to the cavity-defining surface 26.

The lower mold body 12 is also of a generally frame-like configuration and includes an upper cavity-defining surface 32, a lower surface 33 and an inboardmost peripheral surface 34. The lower mold body 12 is of a multi-part movable construction and can be moved in a conventional manner from the closed position shown in FIG. 1 in which the surfaces 25 through 27 and 32 define a closed frame-like mold cavity 35 and an open position (FIG. 2) in which the various lower mold body portions or segments 12 are retracted to an open position at which the inboardmost peripheral surface 34 of the lower mold body 12 is outboard of the cavity-defining surface 25 of the mold cavity 35 of the upper mold body 11.

The inner mold body or core steel 13 includes an uppermost surface 41, a lowermost surface 42 and three outer peripheral surfaces 43, 44 and 45, the latter of which is joined to the two former surfaces by respective annular surfaces 46 and 47. The surfaces 44, 45, 46 and a portion of the surface 47 essentially define the cross-section configuration of the closed mold cavity 35 and specifically define the innermost peripheral configuration thereof in the manner clearly illustrated in FIG. 1. The inner mold body 13 is also a segmented mold body and segments or portions thereof can be shifted inward to an open position (FIG. 2) for purposes to be hereinafter described.

Conventional injectors I, such as the four conventional injectors 60 shown in FIG. 5 of application Ser. No. 08/303,200, are provided to inject hot polymeric/copolymeric synthetic plastic material under pressure into the mold cavity 35 in the closed position thereof (FIG. 1), preferably at each of the four corners (not shown) of the mold cavity 35 to form an opened frame, frame member or encapsulation F under heat and pressure during the conventional molding cycle of an associated injection molding machine.

Figure 2:
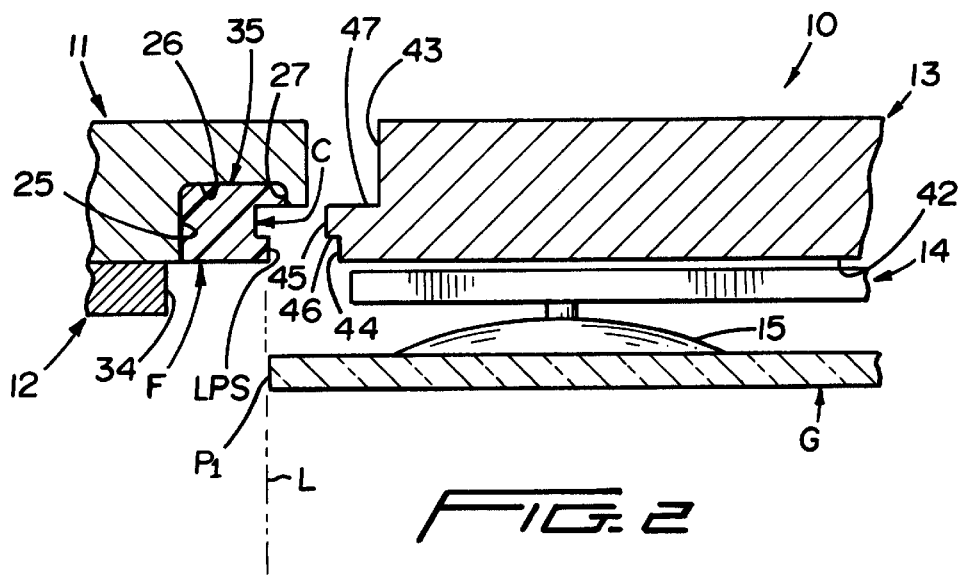
FIG. 2 is a fragmentary diagrammatic cross-sectional view of the mold of FIG. 1, and illustrates the lower mold body and central mold core in their open positions with the movable vacuum cup mounting plate and Ceran®/glass panel positioned identically as shown in FIG. 1.
Figure 3:
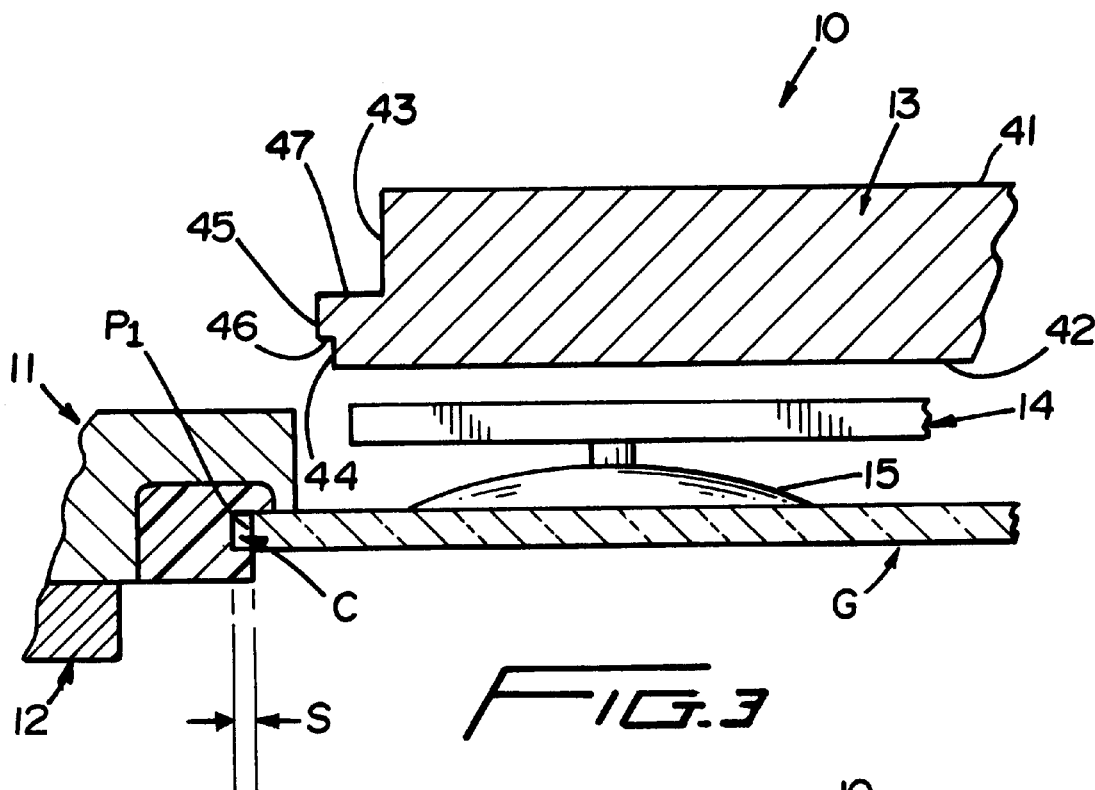
FIG. 3 is a fragmentary diagrammatic cross-sectional view of the mold of FIGS. 1 and 2, and illustrates the central mold core moved upwardly, the vacuum cup mounting plate moved upwardly, and a peripheral edge of the Ceran®/glass panel aligned with a channel of the injection molded frame or encapsulation.
Figure 4:
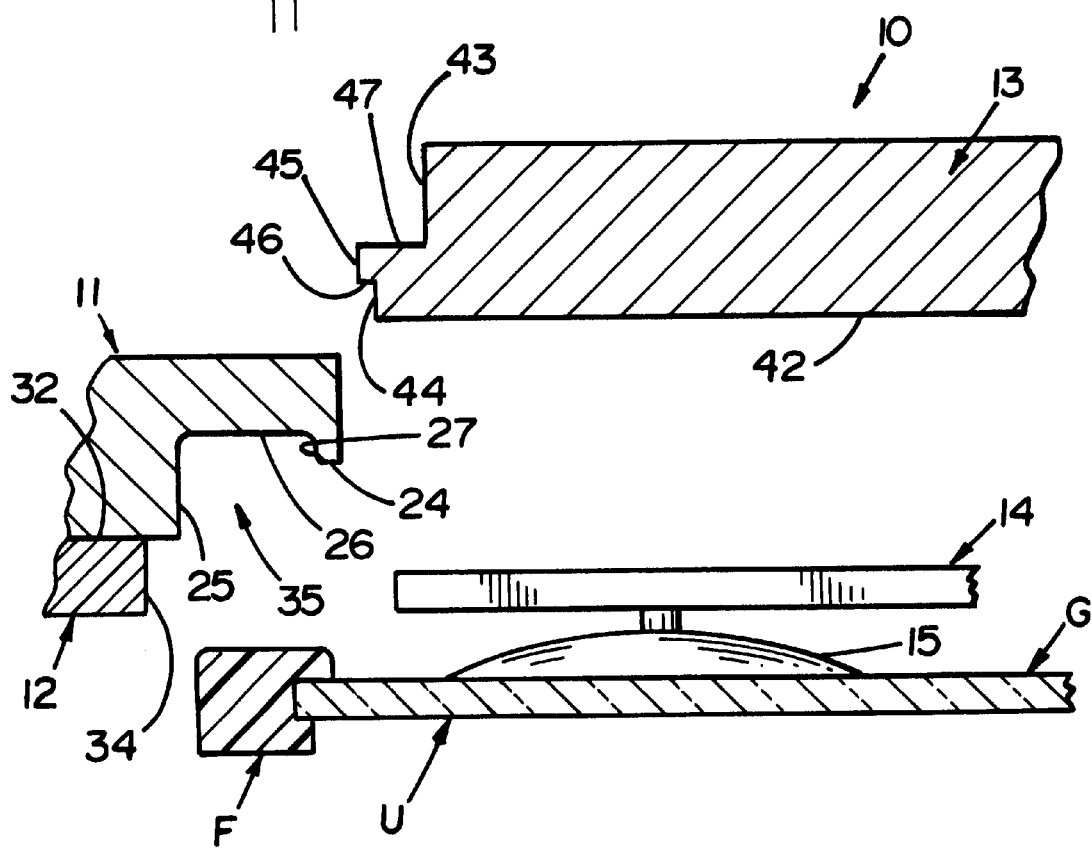
FIG. 4 is a fragmentary diagrammatic cross-sectional view of the mold of FIGS. 1 through 3, and illustrates the manner in which the encapsulation has cooled and shrunk into intimate gripping contact with the peripheral edge of the panel, and the removal of the peripherally encapsulated unit from the mold cavity.

Shortly prior to or during the injection of the pressurized hot plastic material into the mold cavity 35, a generally polygonal/rectangular piece of glass, Ceran® panel or like material G is located in accurate centered relationship to the overall mold 10 and particularly relative to the mold cavity 35. The panel, insert or inner member G includes a peripheral edge P1 which is accurately sized to correspond in shape, size, configuration and overall dimensions to the shape, size, configuration and overall dimensions of the outermost peripheral surface 44 of the inner mold body 13 when closed (FIG. 1), but is ever so slightly smaller in each of its shape, size and configuration and overall dimensions. The slightly smaller shape, size and overall dimensions, including the peripheral dimensions of the glass member G, permits the peripheral edge P1 thereof to be inserted to within, through and beyond) a lowermost peripheral surface LPS of the molded frame or encapsulation F formed by injection in the mold cavity 35 after the inner mold body 13 has been shifted to its open position (FIG. 2). An imaginary alignment line L shown in FIG. 2 reflects the close tolerances between the peripheral edge P1 of the inner member G and the lower peripheral surface LPS of the frame or encapsulate F which, upon upward movement of the inner mold body 13 and the vacuum cup mounting member 14 in the manner shown in FIG. 3, brings the member or panel G to the position shown in FIG. 3 at which its peripheral surface P1 is in alignment with an opposing surface (unnumbered) of the encapsulate F formed by the surface 45 of the inner mold body 13 and in part defining therewith a (peripherally inwardly opening continuous channel) groove or slot C. A peripheral space S (FIG. 3) exists between the innermost bottom peripheral surface (unnumbered) of the continuous channel C and the peripheral edge P1 of the inner member G at and shortly after the time that the mold 10 has been opened and while the encapsulation F remains hot. However, as the encapsulation F cools, the material thereof shrinks and eventually the space or gap S is closed (FIG. 4) which allows the encapsulation F to shrink over, clamp to and bond with the entire peripheral/polygonal edge portion (unnumbered) of the inner member G forming a peripherally encapsulated unit U (FIG. 4) which might be, for example, a door for an oven, a door for a microwave oven, an electronic "touch" control panel or a cook top, such as the ceramic cook top and/or hob top disclosed in U.S. Pat. Nos. 5,036,831; 5,185,047; 4,243,016; 4,363,956; 4,580,550 and/or 4,453,533. Thus, in keeping with the present invention, the Ceran®, glass or like panel G need not be separately post attached to the frame F after cooling and/or mold ejection, nor is the panel G adversely effected by being held in a mold body while the periphery thereof is encapsulated by hot injection molded polymeric/copolymeric material which could adversely effect circuitry of "touch" control panels, as occurs with conventional practices earlier herein mentioned. The peripherally encapsulated unit U is, therefore, capable of rapid and repetitive low cost manufacture absent disadvantages of prior art post assembly or in-mold injection assembly, as is presently conventionally practiced.

Although a preferred embodiment of the invention has been specifically illustrated and described herein, it is to be understood that minor variations may be made in the apparatus without departing from the spirit and scope of the invention, as defined the appended claims.

What is claimed:

1. A method of manufacturing a peripherally encapsulated unit defined by an internal member and a peripheral encapsulation comprising the steps of
   (a) injection molding a peripheral encapsulation in a closed mold, with the peripheral encapsulation being of a predetermined internal peripheral contour and internal peripheral size, from hot polymeric material with the peripheral encapsulation including at least one inwardly opening channel;
   (b) after performing step (a), at least partially opening the mold and relatively positioning a member in internal relationship to the hot molded peripheral encapsulation,
   (c) shrinking the hot peripheral encapsulation sufficiently to bring the inwardly opening channel into embracing relationship with a peripheral edge portion of the member by cooling the encapsulation to reduce the internal peripheral size thereof to thereby unitize the member and peripheral encapsulation into a peripherally encapsulated unit, and
   (d) thereafter removing the encapsulated unit from the mold.

2. The method as defined in claim 1 including during the performance of step (a) forming the at least one inwardly opening channel as a substantially continuous channel.

3. The method as defined in claim 1 including during the performance of step (a) forming the at least one inwardly opening channel defined by at least two inwardly directed relatively spaced channel-defining portions, and during the performance of step (c) shrinking the encapsulation sufficiently to bring the channel-defining portions into embracing relationship with a peripheral edge of the member.

4. The method as defined in claim 1 wherein the member is of a predetermined linear dimension which is less than a first linear dimension of a first portion of the peripheral encapsulation, and step (b) is performed by moving the member within and beyond the peripheral encapsulation first portion.

5. The method as defined in claim 1 wherein the member is of a predetermined linear dimension which is less than a first linear dimension of a first portion of the peripheral encapsulation, and step (b) is performed by moving the member within and beyond the peripheral encapsulation first portion into alignment with a second portion of the peripheral encapsulation having a second linear dimension greater than that of the peripheral encapsulation first portion.

6. The method as defined in claim 1 wherein the peripheral encapsulation includes an inwardly opening channel portion defined by an entrance edge portion, a channel portion bottom surface and an edge portion opposite the entrance edge portion; and performing step (b) by moving the member within and beyond the entrance edge portion and into alignment with the channel portion bottom surface.

7. The method as defined in claim 6 wherein the inwardly opening channel portion is a continuous inwardly opening peripheral channel.

8. The method as defined in claim 6 wherein the entrance edge portion is defined by a linear dimension which is no greater than substantially equal to a linear dimension of the member.

9. The method as defined in claim 6 wherein the entrance edge portion is defined by a linear dimension which is greater than a linear dimension of the member.

10. The method as defined in claim 9 wherein the opposite edge portion is of a linear dimension substantially less than the linear dimension of the member.

11. The method as defined in claim 1 wherein step (b) is performed by relatively moving the member and the hot molded peripheral encapsulation until a peripheral edge of the member is in substantially aligned relationship to the inwardly opening channel, and thereafter performing step (c).

12. The method as defined in claim 1 wherein step (a) is performed in a closed mold defined in part by an inner core which forms the inwardly opening channel, removing the inner core from the inwardly opening channel prior to the performance of step (b), performing step (b) by aligning an edge of the member with the inwardly opening channel, and thereafter performing step (c).

13. The method as defined in claim 2 wherein step (b) is performed by relatively moving the member and the hot molded peripheral encapsulation until a peripheral edge of the member is in substantially aligned relationship to the inwardly opening channel, and thereafter performing step (c).

14. The method as defined in claim 2 wherein step (a) is performed in a closed mold defined in part by an inner core which forms the inwardly opening channel, removing the inner core from the inwardly opening channel prior to the performance of step (b), performing step (b) by aligning an edge of the member with the inwardly opening channel, and thereafter performing step (c).

15. The method as defined in claim 3 wherein step (b) is performed by relatively moving the member and the hot molded peripheral encapsulation until a peripheral edge of the member is in substantially aligned relationship to the inwardly opening channel, and thereafter performing step (c).

16. The method as defined in claim 3 wherein step (a) is performed in a closed mold defined in part by an inner core which forms the inwardly opening channel, removing the inner core from the inwardly opening channel prior to the performance of step (b), performing step (b) by aligning an edge of the member with the inwardly opening channel, and thereafter performing step (c).

17. The method as defined in claim 4 wherein step (b) is performed by relatively moving the member and the hot molded peripheral encapsulation until a peripheral edge of the member is in substantially aligned relationship to the inwardly opening channel, and thereafter performing step (c).

18. The method as defined in claim 4 wherein step (a) is performed in a closed mold defined in part by an inner core which forms the inwardly opening channel, removing the inner core from the inwardly opening channel prior to the performance of step (b), performing step (b) by aligning an edge of the member with the inwardly opening channel, and thereafter performing step (c).

19. The method as defined in claim 5 wherein step (b) is performed by relatively moving the member and the hot molded peripheral encapsulation until a peripheral edge of the member is in substantially aligned relationship to the inwardly opening channel, and thereafter performing step (c).

20. The method as defined in claim 6 wherein step (a) is performed in a closed mold defined in part by an inner core which forms the inwardly opening channel, removing the inner core from the inwardly opening channel prior to the performance of step (b), performing step (b) by aligning an edge of the member with the inwardly opening channel, and thereafter performing step (c).

21. A method of manufacturing a peripherally encapsulated unit defined by an internal member and a peripheral encapsulation comprising the steps of
   (a) injection molding a peripheral encapsulation of a predetermined internal peripheral contour and internal peripheral size from hot polymeric material in a closed mold,
   (b) opening the mold to at least expose a portion of the hot molded peripheral encapsulation,
   (c) relatively positioning a member in internal relationship to the exposed hot molded peripheral encapsulation portion prior to removing the peripheral encapsulated unit from the mold, and
   (d) shrinking the hot molded peripheral encapsulation portion by cooling the same to reduce the internal peripheral size thereof to thereby unitize the member and peripheral encapsulation into a peripherally encapsulated unit.

22. The method as defined in claim 21 wherein the closed mold includes an inner core which imparts the predetermined internal peripheral contour and internal peripheral size to the peripheral encapsulation during the performance of step (a), during the performance of step (b) removing the core to render an inner peripheral surface of the peripheral encapsulation accessible to entry of the internal member, performing step (c) by aligning a peripheral edge of the internal member with the inner peripheral surface of the peripheral encapsulation, and thereafter performing step (d).

23. A method of manufacturing a peripherally encapsulated unit defined by an internal member and a peripheral encapsulation comprising the steps of
  (a) injection molding a peripheral encapsulation having an inner peripheral surface of a predetermined internal peripheral contour and internal peripheral size from hot polymeric material in a closed mold,
  (b) opening the mold to at least expose a portion of the hot molded peripheral encapsulation inner peripheral surface,
  (c) relatively positioning a peripheral edge of a member in internal closely adjacent relationship to the exposed hot molded peripheral encapsulation inner peripheral surface prior to removing the peripheral encapsulated unit from the mold, and
  (d) shrinking the hot molded peripheral encapsulation by cooling the same to reduce the internal peripheral size of the inner peripheral surface to thereby unitize the member and peripheral encapsulation into a peripherally encapsulated unit.

24. A method of manufacturing a peripherally encapsulated unit defined by an internal member and a peripheral encapsulation comprising the steps of
  (a) injection molding hot polymeric material into an annular cavity of a closed mold to thereby form a peripheral encapsulation having an inner peripheral surface of a predetermined internal peripheral contour and internal peripheral size,
  (b) at least partially opening the mold to at least expose a portion of the hot molded peripheral encapsulation inner peripheral surface,
  (c) relatively positioning a peripheral edge of a member in internal closely adjacent relationship to the exposed hot molded peripheral encapsulation inner peripheral surface prior to removing the peripheral encapsulated unit from the mold, and
  (d) shrinking the hot molded peripheral encapsulation before removing the same from the mold to thereby shrink the internal peripheral size of the inner peripheral surface of the peripheral encapsulation to bring the inner peripheral surface into intimate embracing relationship with the member peripheral edge to thereby unitize the member and peripheral encapsulation into a peripherally encapsulated unit.

25. The method as defined in claim 24 including the step of removing the peripherally encapsulated unit from the mold.

26. The method as defined in claim 24 including the step of removing the peripherally encapsulated unit from the mold by movement in a direction substantially normal to a plane of the member.

27. The method as defined in claim 24 wherein the member is glass.

28. The method as defined in claim 24 wherein the closed mold includes an inner core which imparts the predetermined internal peripheral contour and internal peripheral size to the peripheral encapsulation inner peripheral surface during the performance of step (a), during the performance of step (b) removing the core to render the inner peripheral surface of the peripheral encapsulation accessible to entry of the internal member, performing step (c) by aligning a peripheral edge of the internal member with the inner peripheral surface of the peripheral encapsulation, and thereafter performing step (d).

29. The method as defined in claim 25 wherein the closed mold includes an inner core which imparts the predetermined internal peripheral contour and internal peripheral size to the peripheral encapsulation inner peripheral surface during the performance of step (a), during the performance of step (b) removing the core to render the inner peripheral surface of the peripheral encapsulation accessible to entry of the internal member, performing step (c) by aligning a peripheral edge of the internal member with the inner peripheral surface of the peripheral encapsulation, and thereafter performing step (d).

30. The method as defined in claim 26 wherein the closed mold includes an inner core which imparts the predetermined internal peripheral contour and internal peripheral size to the peripheral encapsulation inner peripheral surface during the performance of step (a), during the performance of step (b) removing the core to render the inner peripheral surface of the peripheral encapsulation accessible to entry of the internal member, performing step (c) by aligning a peripheral edge of the internal member with the inner peripheral surface of the peripheral encapsulation, and thereafter performing step (d).

31. The method as defined in claim 27 wherein the closed mold includes an inner core which imparts the predetermined internal peripheral contour and internal peripheral size to the peripheral encapsulation inner peripheral surface during the performance of step (a), during the performance of step (b) removing the core to render the inner peripheral surface of the peripheral encapsulation accessible to entry of the internal member, performing step (c) by aligning a peripheral edge of the internal member with the inner peripheral surface of the peripheral encapsulation, and thereafter performing step (d).

* * * * *